Jan. 21, 1941.　　　W. J. POWERS　　　2,229,471
RETAINER FOR CLOTHESLINES
Filed April 3, 1939　　　2 Sheets-Sheet 1
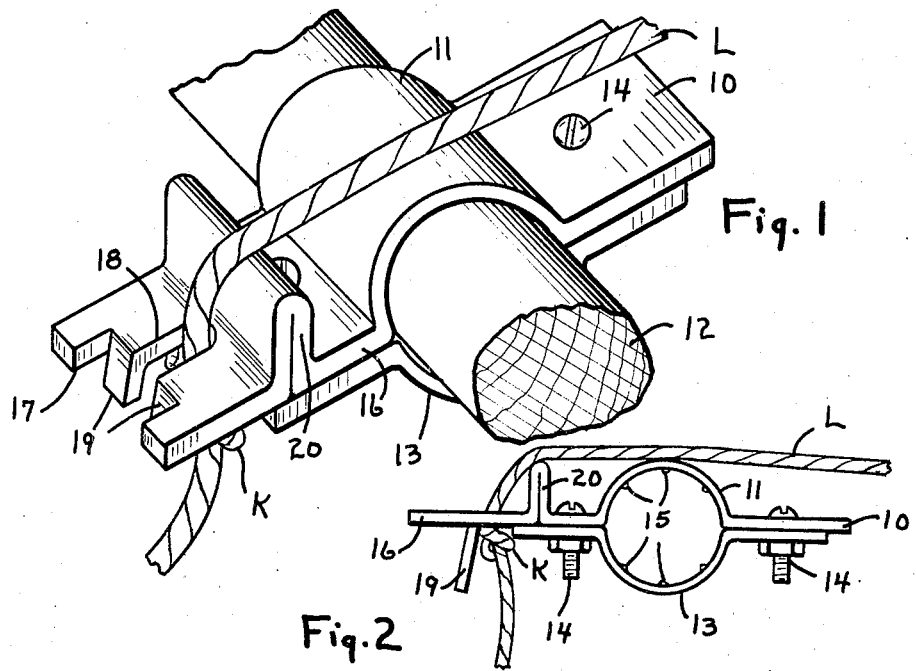
Fig. 1
Fig. 2
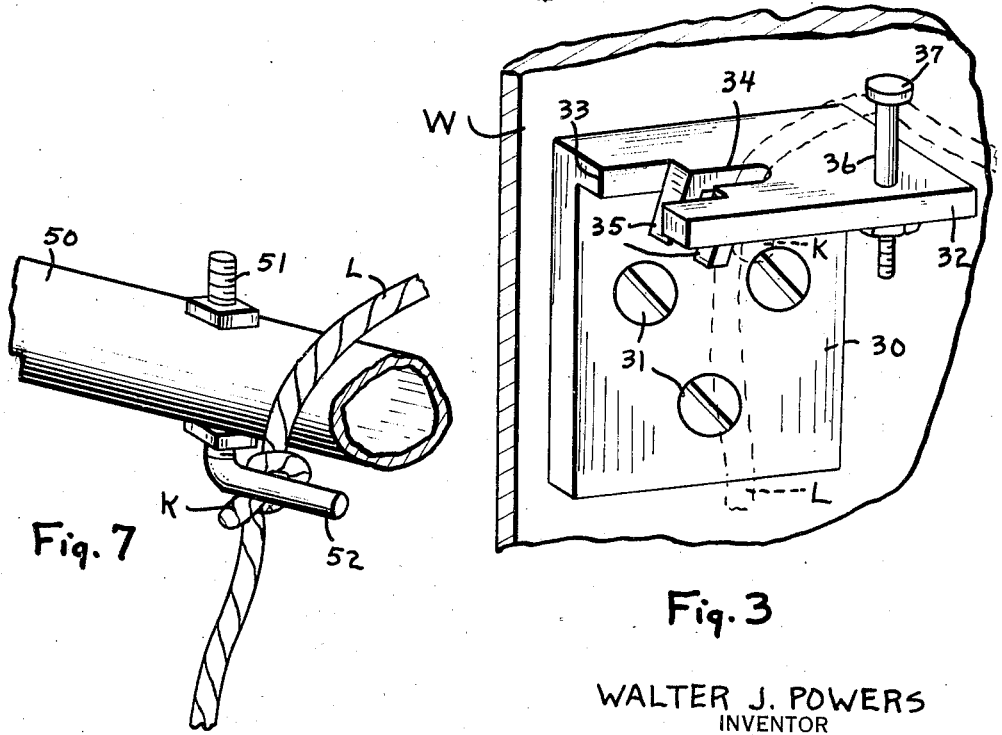
Fig. 7
Fig. 3
WALTER J. POWERS
INVENTOR
BY *J. A. Ellestad*
ATTORNEY Jan. 21, 1941.    W. J. POWERS    2,229,471
RETAINER FOR CLOTHESLINES
Filed April 3, 1939    2 Sheets-Sheet 2

WALTER J. POWERS
INVENTOR
BY *J. A. Ellestad*
ATTORNEY

Patented Jan. 21, 1941

2,229,471

UNITED STATES PATENT OFFICE 2,229,471

RETAINER FOR CLOTHESLINES

Walter J. Powers, Rochester, N. Y.

Application April 3, 1939, Serial No. 265,661

3 Claims. (Cl. 24—128)

This invention relates to devices for holding clotheslines or the like and has for one of its objects the provision of a retaining device for clotheslines or the like which will be simple in structure yet efficient in operation. Another object is to provide a line retaining device which can be easily and quickly manipulated for attaching or removing a line. A further object is to provide notched line retaining means having guard members adjacent the notch so as to prevent accidental removal of the line. These and other objects and advantages reside in certain novel features of construction, arrangement and combination of parts as will hereinafter be more fully explained and pointed out in the appended claims.

Referring to the drawings:

Fig. 1 is a fragmentary perspective view showing my improved line retainer in use.

Fig. 2 is a side view of same.

Fig. 3 is a modification adapted to be attached to a wall.

Fig. 7 is a perspective view showing a further modification in use.

Figure 4:
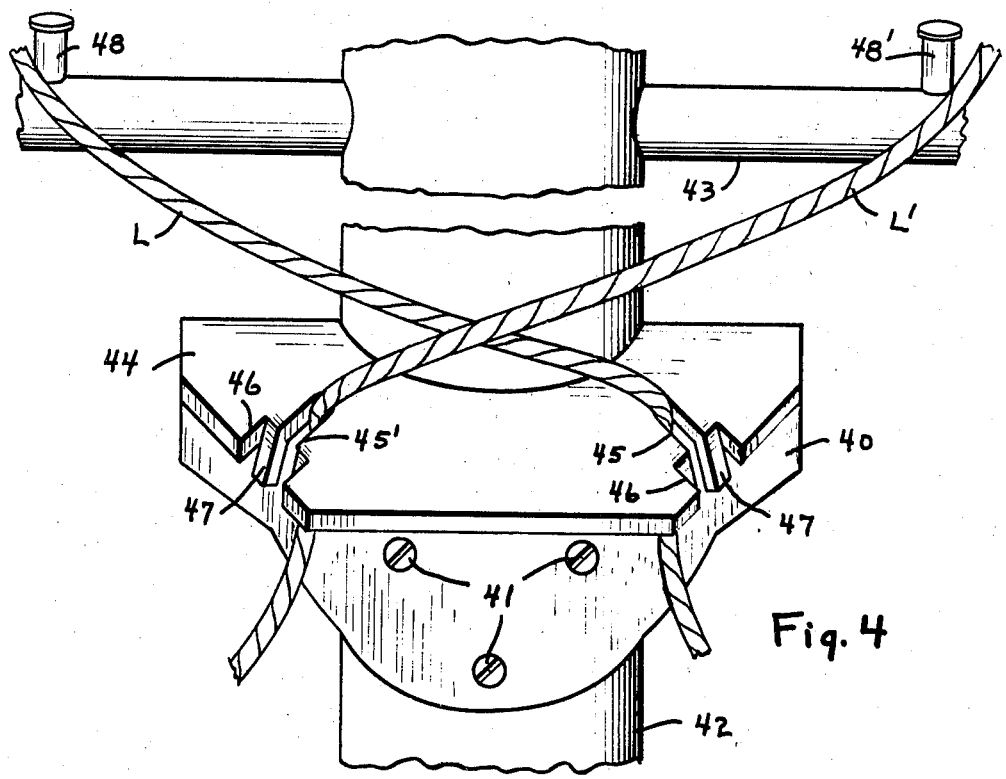
Fig. 4 is a fragmentary view showing another modification attached to a clothes pole.
Figures 5, 6:
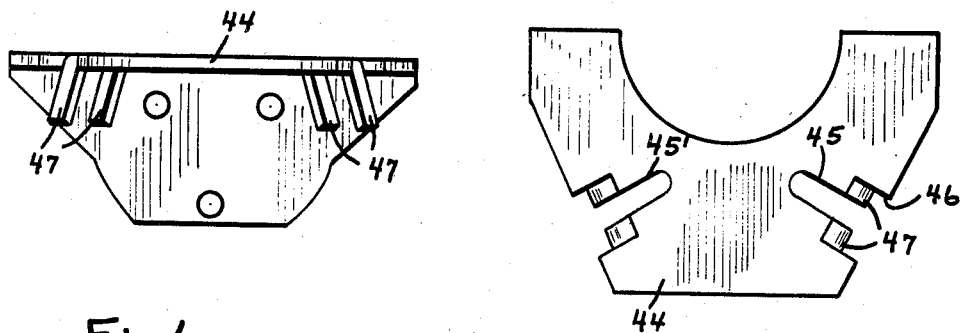
Fig. 5 is a top plan view of the retainer of Fig. 4.
Fig. 6 is an end view of same.

One embodiment of my invention, shown in Figs. 1 and 2, comprises a member 10 having a cylindrical part 11 adapted to fit over the top of the horizontal bar 12 of the usual clothesline pole. A complementary cylindrical part 13 is positioned under the bar 12 and the two parts are clamped tightly onto the bar by means of bolts 14. The inner surfaces of the cylindrical parts are ribbed or scored, as at 15, so as to dig into the bar and insure a tight clamping action. The member 10 has a rearwardly projecting part 16 with its rear edge notched or cut away to provide a relatively wide throat 17 opening into a narrower slot 18. Two downwardly projecting guard fingers 19 are positioned, respectively, at the two sides of slot 18 for a purpose which will presently be explained. Positioned between the slot 18 and the cylindrical part 11 is an upstanding fulcrum 20 which is preferably formed integral with member 10.

In operation, the retainer is clamped onto the horizontal bar 12 and the clothesline L is pulled tightly across the top of part 11 and the fulcrum 20 and thence downwardly into the throat 17 and into the slot 18 so that the knot K on line L will serve to hold the line in slot 18. The downwardly projecting guard fingers 19 will prevent accidental removal of the line as it will be necessary to bring the knot K down beyond fingers 19 in order to release the line. The fulcrum 20 and the wide throat 17 will facilitate the stretching and placing of the line in the slot 18.

The modification shown in Fig. 3 comprises a member 30, adapted to be attached to the wall W by screws 31, having a horizontal plate 32 with one side edge cut away to provide the wide throat 33 and the narrow slot or notch 34 and with the two downwardly projecting guard fingers 35 positioned, respectively, at each side of slot 34. Mounted adjacent the closed end of notch 34 is the upstanding member 36 having an enlarged head 37.

In use, the retaining device 30 is attached to the side wall W of a building, for example, and the line L, shown in dotted line in Fig. 3, stretched perpendicularly to the wall W, is drawn around the snubbing pin 36 and slipped into the slot 34 so that the knot K on the line will hold the line in place. The guard fingers 35 will prevent accidental removal of the line.

In the modification shown in Fig. 4 the retaining device 40 is attached, as by screws 41, to the rear side of the clothesline pole 42 and at a point which is below the horizontal bar 43 carried by pole 42. The line retainer 40 has a rearwardly extending horizontal portion 44 provided at its edge with a plurality of spaced notches 45 and 45', radially positioned with respect to the pole 42. Each notch or slot 45 and 45' opens into a relatively wide throat portion 46 and a downwardly projecting guard finger 47 is located at each side of the open end of the slot 45. Upstanding posts or snubbing pins 48 and 48' are mounted on bar 43 at each side of post 42. The line L' is drawn tightly over the bar 43 and against pin 48' and thence downwardly and over to the opposite side of the pole 42 and into slot 45' where it is held by a knot (not shown) as in the case of the retaining devices of Figs. 1–3. The line L on the opposite side of pole 42 is similarly manipulated and held in slot 45. The wide throat 46 facilitates placement of the line in the slot and the downwardly projecting guard fingers 47 prevent accidental removal of the lines. The retaining device 40 could be modified by providing four or more notches so as to afford means for retaining four or more lines.

The modification of Fig. 7 comprises a horizontal bar 50 which has a vertical opening for receiving the pin 51 having a laterally extending arm 52 positioned close to the bar 50. The line L is stretched over the top of bar 50 and then slipped into the narrow space provided between the arm 52 and bar 50 where it is held by the knot K.

From the foregoing it will be apparent that I am able to attain the objects of my invention and provide a simple yet efficient device for releasably holding a clothesline or the like. It will be obvious that once the retaining knots are tied the lines can be quickly and easily attached to or removed from the devices. As shown, the devices may be attached to the horizontal bars of the usual clothesline poles or they may be attached to the wall of a building. Various modifications can obviously be made without departing from the spirit of my invention.

I claim:

1. A retaining device for clotheslines or the like comprising a substantially horizontal plate having a slot with an open end, and a downwardly projecting guard finger on each side of the slot whereby a line having an enlargement may be inserted in the open end of said slot and retained in position by the enlargement on the line, said spaced guard fingers being located so as to engage the enlargement and prevent accidental removal of the line.

2. A retaining device for clotheslines or the like comprising a member adapted to be attached to a support, said member having a horizontally disposed notch, a vertical portion on said member adjacent the closed end of the notch and a downwardly projecting guard finger located at each side of said notch whereby a line may be drawn against said vertical portion and thence into said notch so that a knot on the line will engage the member and hold the line in position, said vertical portion having an enlarged head whereby the line will be prevented from riding off the portion when the line is being drawn therearound.

3. A retaining device for clotheslines or the like comprising a member having a substantially horizontally disposed notch forming a relatively wide throat, said member having a second and narrower notch communicating with said first notch, and a pair of spaced guard fingers depending from said member between the sides of said throat and adjacent the respective sides of said second notch whereby a line having an enlargement on it may be positioned in said second notch and retained in place, said fingers being adapted to prevent accidental removal of the line.

WALTER J. POWERS.